(12) United States Patent
Ceze et al.

(10) Patent No.: US 8,745,440 B1
(45) Date of Patent: Jun. 3, 2014

(54) COMPUTER-IMPLEMENTED SYSTEM AND METHOD FOR PROVIDING SOFTWARE FAULT TOLERANCE

(75) Inventors: Luis Ceze, Seattle, WA (US); Peter Godman, Seattle, WA (US); Mark Oskin, Seattle, WA (US)

(73) Assignee: F5 Networks, Inc., Seattle, WA (US)

( * ) Notice: Subject to any disclaimer, the term of this patent is extended or adjusted under 35 U.S.C. 154(b) by 432 days.

(21) Appl. No.: 13/239,281

(22) Filed: Sep. 21, 2011

Related U.S. Application Data

(60) Provisional application No. 61/385,123, filed on Sep. 21, 2010.

(51) Int. Cl.
*G06F 11/00* (2006.01)

(52) U.S. Cl.
USPC .................................. 714/11; 714/10; 714/12

(58) Field of Classification Search
CPC ........................... G06F 11/1629; G06F 11/165
USPC ...................................................... 714/10–12
See application file for complete search history.

(56) References Cited

U.S. PATENT DOCUMENTS

| | | | | |
|---|---|---|---|---|
| 6,058,491 A * | 5/2000 | Bossen et al. | ................... | 714/15 |
| 7,231,554 B2 * | 6/2007 | Moser et al. | ............... | 714/38.13 |
| 7,243,262 B2 * | 7/2007 | Mukherjee et al. | ............. | 714/15 |
| 7,308,607 B2 * | 12/2007 | Reinhardt et al. | .............. | 714/25 |
| 7,444,497 B2 * | 10/2008 | Reinhardt et al. | ............ | 712/218 |
| 7,493,516 B2 * | 2/2009 | Ferren et al. | ..................... | 714/10 |
| 7,747,932 B2 * | 6/2010 | Racunas et al. | ................ | 714/799 |
| 7,921,331 B2 * | 4/2011 | Bose et al. | ........................ | 714/21 |
| 8,560,816 B2 * | 10/2013 | Moir et al. | ..................... | 712/228 |
| 2009/0235262 A1 | 9/2009 | Ceze et al. | | |
| 2010/0274972 A1 * | 10/2010 | Babayan et al. | .............. | 711/125 |
| 2012/0005461 A1 * | 1/2012 | Moir et al. | ..................... | 712/228 |

OTHER PUBLICATIONS

Devietti et al., "DMP: Deterministic Shared Memory Multiprocessing," Proceedings of the 14th International Conference on Architectural Support for Programming Languages and Operating Systems, pp. 85-96 (Mar. 7-11, 2009).

* cited by examiner

*Primary Examiner* — Joshua P Lottich
(74) *Attorney, Agent, or Firm* — Perkins Coie LLP

(57) ABSTRACT

A computer-implemented method for providing software fault tolerance is provided. A multithreaded program is executed. The program execution includes a plurality of multithreaded processes. A set of inputs is provided to one of the multithreaded processes and the inputs set is copied to each of the other multithreaded processes. The executions of the multithreaded processes are divided into deterministic subsets of the execution that end at a checkpoint. An execution of the deterministic subset is speculatively executed continuously on one of the multithreaded processes. Upon completion of execution through the checkpoint, the successfully completed execution path through the deterministic subset is retired. Execution of the deterministic instructions subset on the other multithreaded process is continued along the completed execution path.

20 Claims, 3 Drawing Sheets

COMPUTER-IMPLEMENTED SYSTEM AND METHOD FOR PROVIDING SOFTWARE FAULT TOLERANCE

CROSS-REFERENCE

This non-provisional patent application claims priority under 35 USC §119(e) to U.S. provisional patent application, entitled "Computer-Implemented Method For Providing Software Fault Tolerance," Ser. No. 61/385,123, filed Sep. 21, 2010, the disclosure of which is incorporated by reference.

FIELD

This application relates in general to fault tolerant computing and, in particular, to a computer-implemented system and method for providing software fault tolerance.

BACKGROUND

Fault tolerance is an engineering principle that requires a system to continue operating despite failures or faults, albeit with a possibly diminished level of service or capacity. Fault tolerant design has been applied to computer systems to ensure system availability and crash resilience, generally through replication and redundancy. Replication requires multiple components to provide identical functionality while operating in parallel to improve the chances that at least one system is working properly. One way to effect fault tolerance is by following a quorum rule based on a majority of votes as received from the constituent replicated components, the output agreed by the majority is used as the output of the whole system. Redundancy requires multiple components to provide identical functionality, but fault tolerance is instead provided by switching or "failing" over from a faulty component to a spare redundant component. A fault tolerant system can combine both replication and redundancy at different levels of component design. For instance, storage servers conventionally use redundancy in data storage through a redundant array of inexpensive disks, or RAID, hard drive configuration, while also including replicated power supplies to serve as spares in case of the failure of the power supply currently in use.

In general, replication and redundancy provide fault tolerance at the physical component- or hardware-level, where failure conditions can be readily contained by removing a component from service until a permanent repair can be later effected. Replicated or redundant fault tolerance can also be used in software. Providing software fault tolerance through replication or redundancy, though, can be expensive and inefficient in terms of resource utilization and physical component costs. Additionally, software fault tolerance adds the complication of needing to provide continued service often without the certainty that the correct faulty software component has been both identified and rendered harmless. A software error that potentially affects system state could remain undetected and persist latently, only to later rematerialize with possibly catastrophic consequences, despite earlier efforts to undertake fault tolerance.

Alternatively, fault recovery can be used for software to directly address underlying causes of fault or failure, rather than relying on the indirect quorum voting or failover solutions used in fault tolerance. In general, software fault recovery can be provided through either roll forward and roll back. Roll forward requires a software system to attempt to correct its system state upon detecting an error and continue processing forward from that point in execution on by relying on the self-corrections made as being sufficiently remedial. Roll back requires a software system to revert to an earlier, and presumably safe, version of system state and continue processing forward from the earlier version on after backing out any erroneous system state.

However, even with replicated multithreaded software execution, resilience to latent software faults and failures, colloquially referred to as "bugs," is not assured due to the nondeterministic nature of multithreaded programs. Current multicores execute multithreaded code nondeterministically because, given the same inputs, execution threads can potentially interleave their memory and I/O operations differently in each execution. The nondeterminism arises from small perturbations in the execution environment due to, for instance, other processes executing simultaneously, differences in operating system resource allocation, cache and translation lookaside buffer states, bus contention, and other factors relating to microarchitectural structures. Software behavior is subject to change with each execution due to multicore nondeterminism, and runtime faults, such as synchronization errors, can appear at inconsistent times that may defy subsequent efforts to reproduce and remedy. Multithreaded programming is difficult and can lead to complicated bugs. Existing solutions focus on hardware fault tolerance and are ill-suited to resolving the kinds of multithreaded programming bugs necessary for achieving software fault tolerance.

SUMMARY

One embodiment provides a computer-implemented method for providing software fault tolerance. A multithreaded program is executed. The program execution includes a primary multithreaded process and a secondary multithreaded process. A set of inputs is provided to the primary multithreaded process and the inputs set is copied to the secondary multithreaded process. The executions of the primary multithreaded process and the secondary multithreaded process are divided into a deterministic subset of the execution (chunks of the dynamic execution) that ends at a checkpoint. Upon occurrence of a fault in one of the executions on one of the multithreaded processes prior to reaching the checkpoint, an execution path through the deterministic subset for the faulty execution is retired. Execution of the deterministic subset is continued on the other multithreaded process with a subsequent different path to elide the fault being chosen.

A further embodiment provides a computer-implemented method for providing software fault tolerance through state transfer. A multithreaded program is executed. The program execution includes a primary multithreaded process and a secondary multithreaded process. A set of inputs is provided to the primary multithreaded process and the inputs set is copied to the secondary multithreaded process. The executions of the primary multithreaded process and the secondary multithreaded process are divided into a deterministic subset of the execution that ends at a checkpoint. An execution of the deterministic subset is speculatively performed on the secondary multithreaded process. Upon successfully completing the speculative execution up through the checkpoint, the program state is provided to the primary multithreaded process; thus, execution proceeds in the primary process without experiencing a failure.

A still further embodiment provides a computer-implemented method for providing software fault tolerance through a state repository. A multithreaded program is executed. The program execution includes a primary multithreaded process and a secondary multithreaded process. A set of inputs is provided to the primary multithreaded process and the inputs set is copied to the secondary multithreaded process. The executions of the primary multithreaded process and the secondary multithreaded process are divided into a deterministic subset of the execution that ends at a checkpoint. An execution of the deterministic subset is speculatively performed on the secondary multithreaded process. A state repository is searched for a stable execution path while performing the speculative execution, wherein the state repository is searched either periodically or upon encountering a program fault. Upon ending the speculative execution, the program state is stored into the state repository accessible by the primary multithreaded process.

A still further embodiment provides computer-implemented method for providing software fault tolerance through speculative execution. A multithreaded program is executed. The program execution includes a primary multithreaded process and a secondary multithreaded process. A set of inputs is provided to the primary multithreaded process and the inputs set is copied to the secondary multithreaded process. The executions of the primary multithreaded process and the secondary multithreaded process are divided into a deterministic subset of the execution that ends at a checkpoint, wherein the secondary multithreaded process executes slightly behind the primary multithreaded process. Upon occurrence of a fault in the execution of the primary multithreaded process prior to reaching the checkpoint, an execution path through the deterministic subset for the faulty execution is discarded and the secondary multithreaded process is notified to begin speculatively performing one or more executions of the deterministic subset. Upon successfully completing the speculative execution on the secondary multithreaded process up through the checkpoint, the program state is provided to the primary multithreaded process, which resumes execution past the checkpoint that was just transferred.

Still other embodiments will become readily apparent to those skilled in the art from the following detailed description, wherein are described embodiments by way of illustrating the best mode contemplated. As will be realized, other and different embodiments are possible and the embodiments' several details are capable of modifications in various obvious respects, all without departing from their spirit and the scope. Accordingly, the drawings and detailed description are to be regarded as illustrative in nature and not as restrictive.

DETAILED DESCRIPTION

A multithreaded program is a program composed of multiple threads of execution. Each multithreaded process is a process that is executed as multiple sequences of instructions (one for each thread). All threads in a multithreaded process execute simultaneously (or appear to execute simultaneously), that is, in parallel with each other.

Software bugs at runtime in a multithreaded program can cause improper program execution ranging from harmless error to catastrophic system crash.

Figure 1:
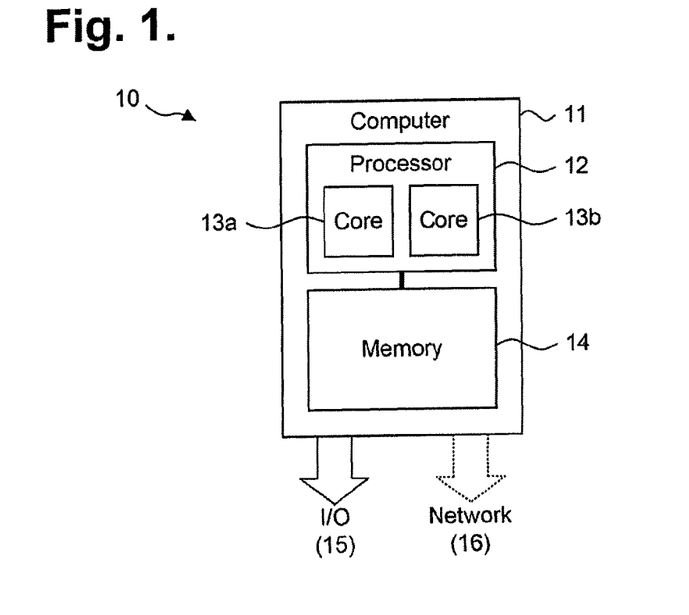
FIG. 1 is a functional block diagram showing a computer-implemented system for providing software fault tolerance in accordance with one embodiment.

Fault tolerance to dynamically avoid such bugs can be provided in a multithreaded program through state replication, deterministic execution, and speculative execution. FIG. 1 is a functional block diagram showing a computer-implemented system 11 for providing software fault tolerance 10 in accordance with one embodiment. The execution environment 10 includes at least one individual stored-program digital computer system 11 operating independently or in collaboration with other digital computer systems (not shown) through a loosely- or tightly-coupled distributed processing arrangement. The computer system 11 performs program execution in a deterministic manner, as further described infra. Each digital computer system 11 is implemented under a von Neumann architecture, Harvard architecture, or other functionally equivalent computer architecture that permits operation under the control of stored program instructions with provisions for receiving inputs from and presenting outputs to a user, machine, network, or other external component.

The computer system 10 provides an execution environment 11 through a multicore or multiprocessor hardware configuration. Uniprocessors embed a single discrete processing core on the die used to fabricate the physical microcircuit. The single processing core limits a uniprocessor to executing one process thread at a time. In contrast, the computer system 10, in one embodiment, includes a multicore processor 12 with a plurality of integrated processing cores 13a, 13b. Multicore processors embed multiple discrete processing cores on a single microcircuit die and are able to execute multiple threads in parallel. Hence, there are at least two processing cores 13a, 13b in processor 12. As well, in a further embodiment, the computer system 10 includes multiple processors (not shown), which are configured to operate in parallel, and are also able to execute multiple threads in parallel. As used herein and for the sake of clarity, a "multicore" will therefore refer to a computer system 10 that is capable of executing multithreaded programs using any combination of uniprocessors, multiprocessors or multicore processors in either a tightly-, loosely-coupled, or other multiprocessing or multicore processing configuration.

The processor 12 is operatively coupled to memory 14 over a system bus. The memory 14 can provide random access, read-only, transactional, cached, or other forms of volatile or non-volatile, and generally transitory, storage of various combinations of program code and data. The memory 14 can be collaboratively shared by individual processing cores 13a, 13b or multiprocessors (not shown).

Finally, the computer 11 includes an input/output ("I/O") interface 15 and, optionally, a network interface 16, that implement provisions for receiving inputs from and presenting outputs to a user, machine, network, or other external component. The computer 11 can further include other components, including user input devices, such as a keyboard and pointing device, user output devices, such as a visual display or hardcopy printer, external storage, and the like.

Figure 2:
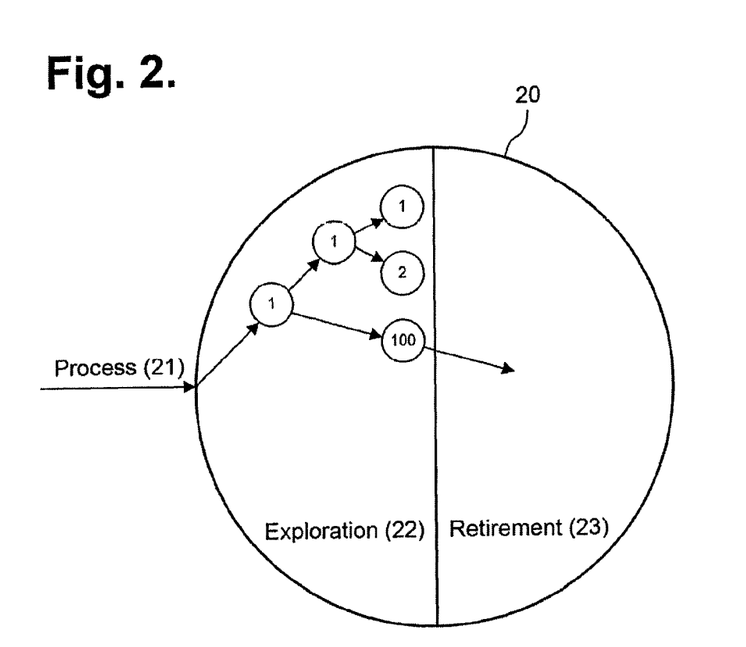
FIG. 2 is a block diagram showing, by way of example, deterministic simulation as performed using the execution environment of FIG. 1.

As part of providing fault tolerant bug avoidance, program instructions may be speculatively executed or "simulated" in an effort to identify a safe execution path. FIG. 2 is a block diagram showing, by way of example, deterministic simulation 20 as performed using the execution environment 10 of FIG. 1. Simulation 20 helps cull through sections of program execution that may contain program errors by recommending candidate execution paths.

Simulation is performed for a user in a deterministic environment. For simplicity, simulation 20 will initially be explained in the context of a single non-multithreaded process. A single sequence of program instructions 21 is deterministically executed. A subset of the sequence of program instructions may be speculatively executed and categorized through simulation 20, which includes exploration 22 and retirement 23. During the exploration 22, execution of various paths through the program instructions subset is simulated. Those execution paths leading to program error receive low scores, for instance, paths "1-1-1" and "1-1-2," while correctly executing paths, for example, "1-100," receive high scores, or vice versa, depending upon the implementation. During retirement 23, execution paths without bugs are replayed for the user, which is termed "retirement," as the simulation is retired onto the user's machine. In other words, good execution paths are retired and bad execution paths containing, for instance, bugs, are discarded.

Identifying communication interleavings in a multithreaded program that provide deterministic inter-thread communication via shared memory also enables execution to be fully deterministic. Thus, the simulation 20 identifies freely reorderable paths of execution in each thread of a given multithreaded process. During the exploration phase 22, the simulation can suspend the execution of one or more of the thread to control access to a particular shared memory location and thereby exercise program execution control over different communication interleavings. The communication interleavings are then used to guarantee deterministic execution and to find executions that do not exhibit buggy behavior.

Figure 3:
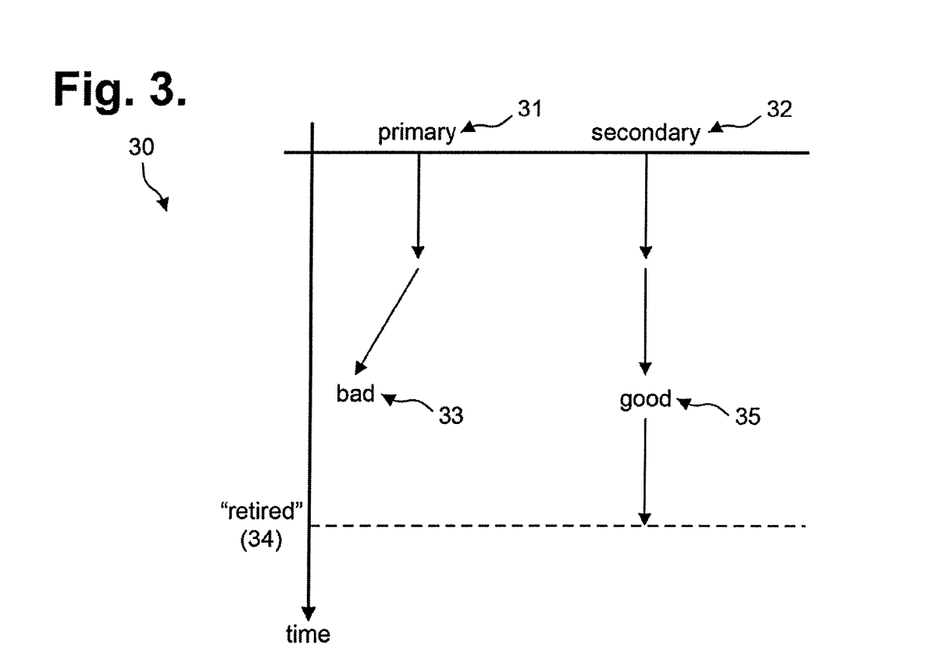
FIG. 3 is a timing diagram showing fault tolerance in a multithreaded program in accordance with one embodiment.

The ability to ensure fully deterministic execution for multithreaded programs, when coupled with state replication and speculative execution, creates an environment in which fault tolerant software execution can be provided. FIG. 3 is a timing diagram showing fault tolerance 30 in a multithreaded program 10 in accordance with one embodiment. The x-axis represents one or more executions of multithreaded processes, which are each executing in a fully deterministic manner, as further described infra. The y-axis represents time, where progress through each of the multithreaded processes moves forward over time.

A multithreaded program is executed. The program execution includes a primary multithreaded process 31 and a secondary multithreaded process 32. A set of inputs is provided to the primary multithreaded process 31 and the inputs set is copied to the secondary multithreaded process 32. The executing instructions in the program are divided into a deterministic subset of the execution, which ends at a known checkpoint in execution. The checkpoint could be, for instance, the last instruction at the end of a predetermined number of instructions that form a quantum, as further described below with respect to the discussion on deterministic multiprocessing. Execution deterministically proceeds through the instructions on each multithreaded process 31, 32 in parallel. Upon encountering a fault in execution in either of the multithreaded processes 31, 32 prior to reaching the checkpoint in the deterministic subset, the "bad" execution path 33 is discarded from execution, that is, the instructions in the execution path are marked as faulty, and deterministic execution proceeds in the other multithreaded process along an execution path 35 that does not contain the same program fault, so a good path is 34 "retired." Consequently, the fault in execution is rendered inoperative and program execution continues on the remaining multithreaded process along a "good" execution path without having encountered adverse affect or program failure.

In a simulation only variation (not shown), simulation is continuously, or semi-continuously, performed on a further multithreaded process. Upon the occurrence of a fault in the speculative execution prior to reaching the checkpoint, the execution path through the deterministic subset for the faulty execution is discarded. Upon successfully reaching the checkpoint in the speculative execution, an execution path through the deterministic subset for the successful execution is retired.

Figure 4:
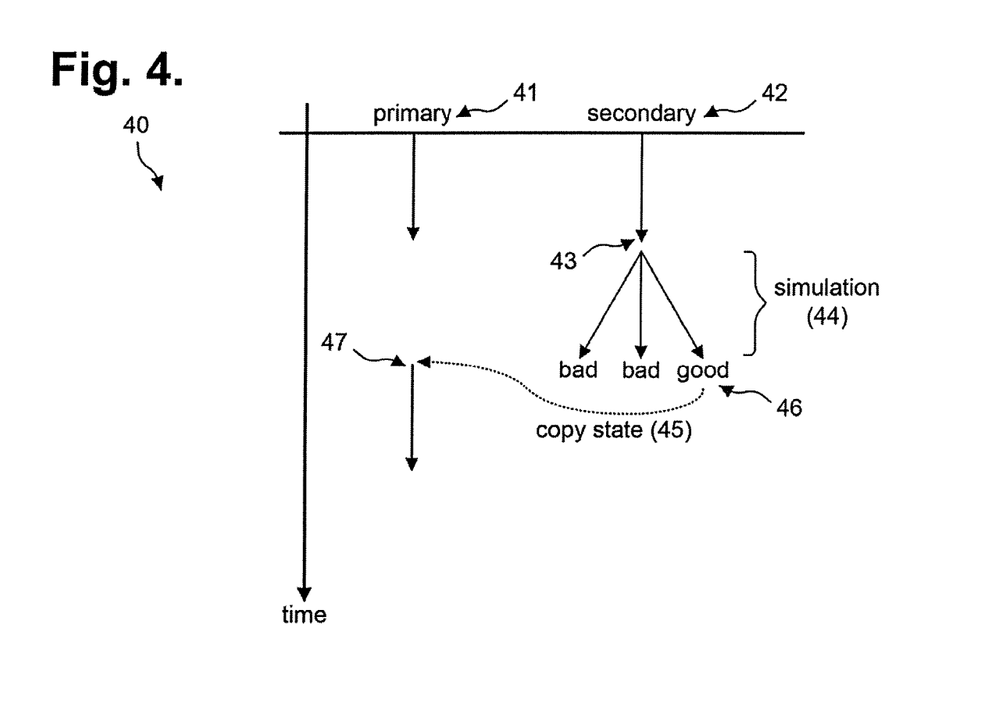
FIG. 4 is a timing diagram showing fault tolerance in a multithreaded program through state communications in accordance with a further embodiment.

In a further embodiment, fault tolerant software execution can be provided by copying simulation state as obtained through deterministic execution. FIG. 4 is a timing diagram showing fault tolerance 40 in a multithreaded program 10 through state communications in accordance with a further embodiment. The x-axis represents one or more executions of multithreaded processes, which are each executing in a fully deterministic manner, as further described infra. The y-axis represents time, where progress through each of the multithreaded processes moves forward over time.

As before, a multithreaded program is executed. The program execution includes a primary multithreaded process 41 and a secondary multithreaded process 42. A set of inputs is provided to the primary multithreaded process 41 and the inputs set is copied to the secondary multithreaded process 42. The executing instructions in the program are divided into a deterministic subset of the execution, which ends at a known checkpoint in execution. Execution deterministically proceeds through each deterministic subset on each multithreaded process 41, 42 in parallel. Starting at the beginning 43 of the deterministic subset, execution of the primary multithreaded process 41 is paused while the secondary multithreaded process 42 undertakes simulation 44. During simulation 44, instructions in the deterministic subset are speculatively executed to identify different execution paths, some of which may result in a program error. Thereafter, the program state 45 for the secondary multithreaded process 42, which includes program parameters, is copied to the primary multithreaded process 41 upon determining an execution path 45 that does not contain a program fault. Execution of the primary multithreaded process 41 thereafter continues, which is able to skip executing the "bad" execution paths and avoid adverse affect or program failure.

Figure 5:
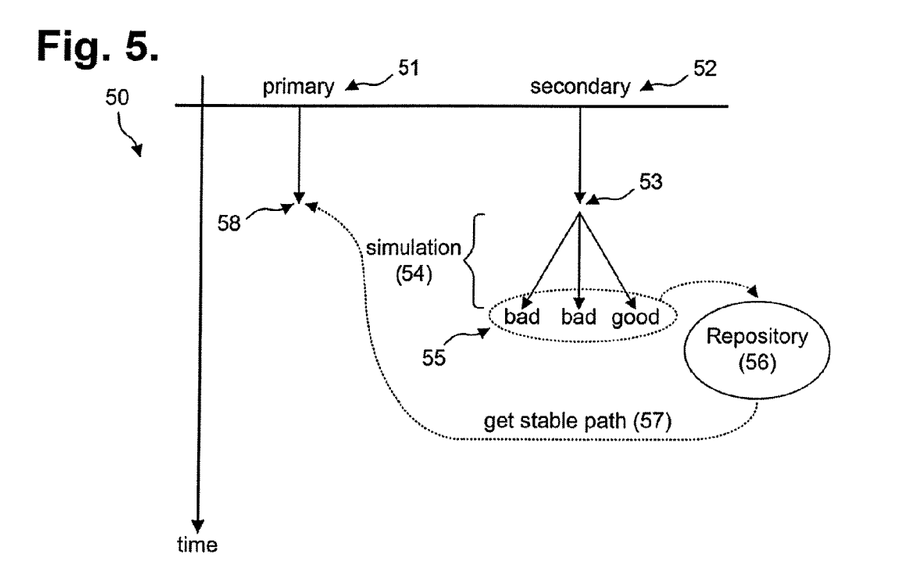
FIG. 5 is a timing diagram showing fault tolerance in a multithreaded program through a state repository in accordance with a further embodiment.

In a still further embodiment, fault tolerant software execution can be provided by creating a execution path repository shared by all of the multithreaded process executions to characterize the various execution paths (or thread interleavings) encountered during deterministic execution. FIG. 5 is a timing diagram showing fault tolerance 50 in a multithreaded program 10 through a state repository in accordance with a further embodiment. The x-axis represents one or more executions of multithreaded processes, which are each executing in a fully deterministic manner, as further described infra. The y-axis represents time, where progress through each of the multithreaded processes moves forward over time.

As before, a multithreaded program is executed. The program execution includes a primary multithreaded process 51 and a secondary multithreaded process 52. A set of inputs is provided to the primary multithreaded process 51 and the inputs set is copied to the secondary multithreaded process 52. The executing instructions in the program are divided into a deterministic subset of the execution, which ends at a known checkpoint in execution. Execution deterministically proceeds through each deterministic subset on each multithreaded process 51, 52 in parallel. Starting at the beginning 53 of the deterministic subset, execution of the primary multithreaded process 51 is paused while the secondary multithreaded process 52 undertakes simulation 54. During simulation 54, instructions in the deterministic subset are speculatively executed to identify different execution paths, some of which may result in a program error. Rather than retiring any "bad" execution paths, the program state from one or more of the simulation rounds is instead saved into a repository 56 that is shared by all of the multithreaded process executions (primary, secondary, and so on) 51, 52. The saved program state can be any combination of program state for "bad" execution paths or "good" execution paths. The primary multithreaded process 51 can thereafter obtain a stable execution path 57 from the repository 56 by periodically, or upon a fault, searching the repository 56 and continue execution 58 without having encountered adverse affect or program failure. The repository is searched based on the state immediately prior to the point where the primary process stopped.

Figure 6:
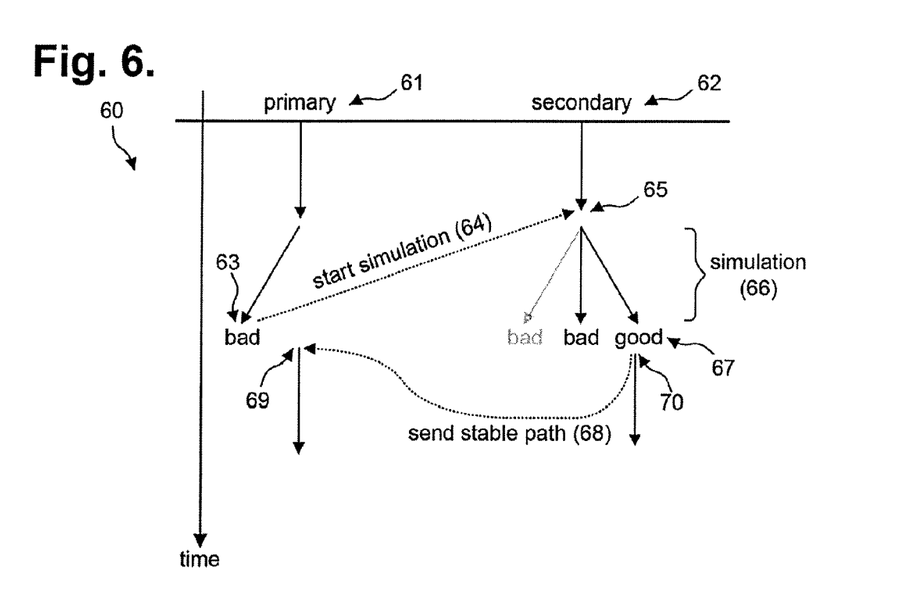
FIG. 6 is a timing diagram showing fault tolerance in a multithreaded program through speculative execution in accordance with a further embodiment.

Finally, fault tolerant software execution can be provided by performing speculative deterministic execution on-demand to identify potential program error. FIG. 6 is a timing diagram showing fault tolerance 60 in a multithreaded program 10 through speculative execution in accordance with a further embodiment. The x-axis represents one or more executions of multithreaded processes, which are each executing in a fully deterministic manner, as further described infra. The y-axis represents time, where progress through each of the multithreaded processes moves forward over time.

As before, a multithreaded program is executed. The program execution includes a primary multithreaded process 61 and a secondary multithreaded process 62. However, the primary multithreaded process 61 executes slightly ahead of the secondary multithreaded process 62 or, stated differently, the secondary multithreaded process 62 executes slightly behind the primary multithreaded process 61. A set of inputs is provided to the primary multithreaded process 61 and the inputs set is copied to the secondary multithreaded process 62. The executing instructions in the program are divided into a deterministic subset of the execution, which ends at a known checkpoint in execution. Execution deterministically proceeds through each deterministic subset on each multithreaded process 61, 62 in parallel. Upon encountering a program bug 63, the primary multithreaded process 61 sends a message 64 to the secondary multithreaded process 62 requesting speculative execution, starting at the beginning 65 of the deterministic subset. During simulation 66, instructions in the deterministic subset are speculatively executed to identify different execution paths, some of which may result in a program error. Thereafter, the secondary multithreaded process 62 picks an execution path (or thread interleaving) 67 that does not contain a program fault and the program state 68 is copied to the primary multithreaded process 41. The execution path 63 containing the original program fault is also discarded. Execution of both of the multithreaded processes 61, 62 thereafter continues with the primary multithreaded process 61 effectively recovering from the program error through reliance on the program state provided by the copied stable execution path 68.

Fully deterministic execution can be provided through deterministic multiprocessing ("DMP"), which provides that the behavior of an arbitrary multithreaded program with DMP is only a function of the programs inputs, as described in commonly-assigned U.S. patent application, entitled "Deterministic Multiprocessing," Pub. No. US 2009/0165006, filed Jun. 25, 2009, pending, and U.S. patent application, entitled "Efficient Deterministic Multiprocessing," Pub. No. US 2009/0235262, filed Sep. 17, 2009, pending, the disclosures of which are incorporated herein by reference. Other mechanisms for providing deterministic multithreaded program execution could also be employed.

Under DMP, inter-thread communication is fully deterministic, which relies on the notion that nondeterminism in program execution occurs when a particular dynamic instance of a load instruction reads data created from a different dynamic instance of a store instruction, such as described in Devietti et al., "DMP: Deterministic Shared Memory Multiprocessing," ASPLOS '09 (Mar. 7-11, 2009), the disclosure of which is incorporated by reference. The set of all pairs of communicating dynamic load and store instructions that occur during execution can be defined as the communication set for the program. In the most general fashion, the communication set can be used to control program execution, and thereby guarantee deterministic execution. Instructions up through each of the dynamic load and store instructions are selected and a deterministic ordering of the instructions preceding each of the selected dynamic load and store instructions can be specified.

More specifically, deterministic execution can be provided through deterministic serialization, by use of a sharing table, through use of transactional memory either with or without forwarding, and by heuristic synchronization and sharing of quantum building blocks of program instructions. There are other ways to provide deterministic execution. The instructions are subdivided into deterministic subsets of instructions, each known as a quanta, which can be a predetermined finite, deterministic number of instructions or a set of instructions determined dynamically. Each quantum is specified to as a subset of the instructions in the communication set. Each of the deterministic execution mechanisms rely on the use of instruction quanta.

Under deterministic serialization, each multithreaded process must obtain a memory access token, known as a deterministic token, as a precondition to accessing a shared memory location and the deterministic token must be passed to the next thread in a deterministic order when the shared memory operation is completed. The rule can be relaxed to permit thread execution up through the point of performing a dynamic load and store instruction and thereby avoid overly aggressive program execution serialization.

A sharing table helps to improve the performance of deterministic parallel execution by leveraging the observation that threads do not communicate all of the time. Each quantum is broken up into two parts, which include a communication-free prefix that can execute in parallel with other quanta, and a suffix that occurs from the first point of communication in the instructions onwards. A sharing table contains sharing information for each memory position and can be maintained at different architectural granularities (word, line, pages, and so forth). The sharing table allows the threads to detect inter-thread communication and block at a deterministic point. At runtime, each multithreaded process will block either at its first point of inter-thread communication, or at the end of its current quantum. Inter-thread communication occurs either when a thread reads data held privately by another thread, or writes to shared data, thereby privatizing the data. Deterministic serialization therefore only occurs when threads communicate.

Transactional memory allows quanta to appear to execute atomically, that is, with the appearance of a single instruction in the deterministic total order by using a deterministic commit ordering of changes to the shared memory. The instructions in each quantum are speculatively executed in parallel against the transactional memory as single atomic operations. Following atomic execution, any changes to the transactional memory can be committed to the shared memory, so long as no memory overlapping accesses between two or more threads have occurred. Otherwise, in the case of conflict, the operations performed by the offending quantum are quashed and the quantum is re-executed. In a further embodiment, data exchange between two or more quanta is permitted, even though their respective executions have not been committed. If the deterministic total order is violated, the executions of each of the participating are quashed and the quanta are all re-executed.

Finally, quanta can be dynamically tuned through heuristic synchronization and sharing to exploit the observation that instruction count-based quantum building does not reflect the runtime reality that threads execute at the different rates. Heuristically, the size of quanta can be adapted to improve progress up through the point where critical thread changes occur, particularly when threads communicate with each other through synchronization operations and data sharing. Heuristic synchronization ends the deterministic execution of a quantum when an unlock operation is performed, after which the execution remains halted until a lock operation occurs. Sharing heuristic relies on information about data sharing to identify when a thread has potentially completed work on shared data, after which execution of the quantum ends. The end point can be specified as, for instance, a fixed number of memory operations past the last shared memory access. Finally, the two heuristic approaches can be performed in combination.

While the invention has been particularly shown and described as referenced to the embodiments thereof, those skilled in the art will understand that the foregoing and other changes in form and detail may be made therein without departing from the spirit and scope.

What is claimed is:

1. A computer-implemented system for providing software fault tolerance, comprising:
    a computer comprising a processor and memory within which code for execution by the processor is stored, comprising:
        an execution environment configured to execute a multithreaded program, wherein the program execution comprising a primary multithreaded process and a secondary multithreaded process;
        a set of inputs provided to the primary multithreaded process and copied to the secondary multithreaded process;
        an exploration module configured to divide the executions of the primary multithreaded process and the secondary multithreaded process into a deterministic subset of the execution that ends at a checkpoint; and
        a retirement module configured to, upon occurrence of a fault in one of the executions on one of the multithreaded processes prior to reaching the subset checkpoint, retire an execution path through the deterministic subset for the faulty execution, continue execution of the deterministic subset on the other multithreaded process, and choose a different path to elide the fault.

2. A system according to claim 1, further comprising:
    a deterministic multiprocessing module configured to determine communicating instructions across the multithreaded processes comprising load, store and I/O operations, and to specify a deterministic ordering of the communicating instructions for the execution of the multithreaded processes.

3. A system according to claim 1, wherein the program execution comprises a further multithreaded process, further comprising:
    a speculative execution module configured to speculatively perform an execution of the deterministic subset either continuously or semi-continuously on the further multithreaded process,
    wherein the retirement module is further configured to,
        upon occurrence of a fault in the speculative execution prior to reaching the checkpoint, discard an execution path through the deterministic subset for the faulty execution; and
        upon successfully reaching the checkpoint in the speculative execution, retire an execution path through the deterministic subset for the successful execution.

4. A computer-implemented method for providing software fault tolerance, comprising:
    executing a multithreaded program, wherein the program execution comprising a primary multithreaded process and a secondary multithreaded process;
    providing a set of inputs to the primary multithreaded process and copying the inputs set to the secondary multithreaded process;
    dividing the executions of the primary multithreaded process and the secondary multithreaded process into a deterministic subset of the execution that ends at a checkpoint; and
    upon occurrence of a fault in one of the executions on one of the multithreaded processes prior to reaching the subset checkpoint, retiring an execution path through the deterministic subset for the faulty execution, continuing execution of the deterministic subset on the other multithreaded process, and choosing a different path to elide the fault.

5. A method according to claim 4, further comprising:
    determining communicating instructions across the multithreaded processes comprising load, store and I/O operations; and
    specifying a deterministic ordering of the communicating instructions for the execution of the multithreaded processes.

6. A method according to claim 4, wherein the program execution comprises a further multithreaded process, further comprising:
    speculatively performing an execution of the deterministic subset either continuously or semi-continuously on the further multithreaded process;
    upon occurrence of a fault in the speculative execution prior to reaching the checkpoint, discarding an execution path through the deterministic subset for the faulty execution; and
    upon successfully reaching the checkpoint in the speculative execution, retiring an execution path through the deterministic subset for the successful execution.

7. A computer-implemented system for providing software fault tolerance through state transfer, comprising:
    a computer comprising a processor and memory within which code for execution by the processor is stored, comprising:
        an execution environment configured to execute a multithreaded program, wherein the program execution comprising a primary multithreaded process and a secondary multithreaded process;

a set of inputs provided to the primary multithreaded process and copied to the secondary multithreaded process;
an exploration module configured to divide the executions of the primary multithreaded process and the secondary multithreaded process into a deterministic subset of the execution that ends at a checkpoint; and
a speculative execution module configured to speculatively perform an execution of the deterministic subset on the secondary multithreaded process and, upon successfully completing the speculative execution up through the checkpoint, provide the program state to the primary multithreaded process.

8. A system according to claim 7, further comprising:
a deterministic multiprocessing module configured to determine communicating instructions across the multithreaded processes comprising load, store and I/O operations, and to specify a deterministic ordering of the communicating instructions for the execution of the multithreaded processes.

9. A computer-implemented method for providing software fault tolerance through state transfer, comprising:
executing a multithreaded program, wherein the program execution comprising a primary multithreaded process and a secondary multithreaded process;
providing a set of inputs to the primary multithreaded process and copying the inputs set to the secondary multithreaded process;
dividing the executions of the primary multithreaded process and the secondary multithreaded process into a deterministic subset of the execution that ends at a checkpoint; and
speculatively performing an execution of the deterministic subset on the secondary multithreaded process and, upon successfully completing the speculative execution up through the checkpoint, providing the program state to the primary multithreaded process.

10. A method according to claim 9, further comprising:
determining communicating instructions across the multithreaded processes comprising load, store and I/O operations; and
specifying a deterministic ordering of the communicating instructions for the execution of the multithreaded processes.

11. A computer-implemented system for providing software fault tolerance through a state repository, comprising:
a computer comprising a processor and memory within which code for execution by the processor is stored, comprising:
an execution environment configured to execute a multithreaded program, wherein the program execution comprising a primary multithreaded process and a secondary multithreaded process;
a set of inputs to the primary multithreaded process and copied to the secondary multithreaded process;
an exploration module configured to divide the executions of the primary multithreaded process and the secondary multithreaded process into a deterministic subset of the execution that ends at a checkpoint;
a speculative execution module configured to speculatively perform an execution of the deterministic subset on the secondary multithreaded process, including searching a state repository for a stable execution path while performing the speculative execution, wherein the state repository is searched either periodically or upon encountering a program fault; and
a storage module configured to, upon ending the speculative execution, store the program state into the state repository accessible by the primary multithreaded process.

12. A system according to claim 11, further comprising:
a deterministic multiprocessing module configured to determine communicating instructions across the multithreaded processes comprising load, store and I/O operations, and to specify a deterministic ordering of the communicating instructions for the execution of the multithreaded processes.

13. A system according to claim 11, further comprising at least one of:
a fault storage module configured to store an execution path through the deterministic subset into the state repository when the ending comprises a faulty execution prior to reaching the checkpoint; and
a completion storage module configured to store an execution path through the deterministic subset into the state repository when the ending comprises completing the speculative execution up through the checkpoint.

14. A computer-implemented method for providing software fault tolerance through a state repository, comprising:
executing a multithreaded program, wherein the program execution comprising a primary multithreaded process and a secondary multithreaded process;
providing a set of inputs to the primary multithreaded process and copying the inputs set to the secondary multithreaded process;
dividing the executions of the primary multithreaded process and the secondary multithreaded process into a deterministic subset of the execution that ends at a checkpoint;
speculatively performing an execution of the deterministic subset on the secondary multithreaded process, including searching a state repository for a stable execution path while performing the speculative execution, wherein the state repository is searched either periodically or upon encountering a program fault; and
upon ending the speculative execution, storing the program state into the state repository accessible by the primary multithreaded process.

15. A method according to claim 14, further comprising:
determining communicating instructions across the multithreaded processes comprising load, store and I/O operations; and
specifying a deterministic ordering of the communicating instructions for the execution of the multithreaded processes.

16. A method according to claim 14, further comprising at least one of:
storing an execution path through the deterministic subset into the state repository when the ending comprises a faulty execution prior to reaching the checkpoint; and
storing an execution path through the deterministic subset into the state repository when the ending comprises completing the speculative execution up through the checkpoint.

17. A computer-implemented system for providing software fault tolerance through speculative execution, comprising:
a computer comprising a processor and memory within which code for execution by the processor is stored, comprising:
an execution environment configured to execute a multithreaded program, wherein the program execution comprising a primary multithreaded process and a secondary multithreaded process;

a set of inputs to the primary multithreaded process and copied to the secondary multithreaded process;

an exploration module configured to divide the executions of the primary multithreaded process and the secondary multithreaded process into a deterministic subset of the execution that ends at a checkpoint, wherein the secondary multithreaded process executes slightly behind the primary multithreaded process; and a retirement module configured to, upon occurrence of a fault in the execution of the primary multithreaded process prior to reaching the checkpoint, discard an execution path through the deterministic subset for the faulty execution and notify the secondary multithreaded process to begin speculatively performing one or more executions of the deterministic subset, wherein, upon successfully completing the speculative execution on the secondary multithreaded process up through the checkpoint, the exploration module provides the program state to the primary multithreaded process, which resumes execution past the checkpoint that was just transferred.

18. A system according to claim 17, further comprising:

a deterministic multiprocessing module configured to determine communicating instructions across the multithreaded processes comprising load, store and I/O operations, and to specify a deterministic ordering of the communicating instructions for the execution of the multithreaded processes.

19. A computer-implemented method for providing software fault tolerance through speculative execution, comprising:

executing a multithreaded program, wherein the program execution comprising a primary multithreaded process and a secondary multithreaded process;

providing a set of inputs to the primary multithreaded process and copying the inputs set to the secondary multithreaded process;

dividing the executions of the primary multithreaded process and the secondary multithreaded process into a deterministic subset of the execution that ends at a checkpoint, wherein the secondary multithreaded process executes slightly behind the primary multithreaded process;

upon occurrence of a fault in the execution of the primary multithreaded process prior to reaching the checkpoint, discarding an execution path through the deterministic subset for the faulty execution and notifying the secondary multithreaded process to begin speculatively performing one or more executions of the deterministic subset; and upon successfully completing the speculative execution on the secondary multithreaded process up through the checkpoint, providing the program state to the primary multithreaded process, which resumes execution past the checkpoint that was just transferred.

20. A method according to claim 19, further comprising:

determining communicating instructions across the multithreaded processes comprising load, store and I/O operations; and specifying a deterministic ordering of the communicating instructions for the execution of the multithreaded processes.

* * * * *

UNITED STATES PATENT AND TRADEMARK OFFICE
CERTIFICATE OF CORRECTION

PATENT NO.         : 8,745,440 B1
APPLICATION NO.    : 13/239281
DATED              : June 3, 2014
INVENTOR(S)        : Luis Ceze et al.

It is certified that error appears in the above-identified patent and that said Letters Patent is hereby corrected as shown below:

In the Specification

In column 4, line 12-31, delete "Fault tolerance to dynamically avoid such bugs can be provided in a multithreaded program through state replication, deterministic execution, and speculative execution. FIG. 1 is a functional block diagram showing a computer-implemented system 11 for providing software fault tolerance 10 in accordance with one embodiment. The execution environment 10 includes at least one individual stored-program digital computer system 11 operating independently or in collaboration with other digital computer systems (not shown) through a loosely- or tightly-coupled distributed processing arrangement. The computer system 11 performs program execution in a deterministic manner, as further described infra. Each digital computer system 11 is implemented under a von Neumann architecture, Harvard architecture, or other functionally equivalent computer architecture that permits operation under the control of stored program instructions with provisions for receiving inputs from and presenting outputs to a user, machine, network, or other external component." and insert the same on Col. 4, Line 11, as the continuation of the same paragraph.

Signed and Sealed this
Eighteenth Day of August, 2015

Michelle K. Lee
*Director of the United States Patent and Trademark Office*